United States Patent
Lang

(10) Patent No.: US 9,570,724 B2
(45) Date of Patent: Feb. 14, 2017

(54) ENERGY STORAGE DEVICE TO BE MOUNTED ON A BICYCLE FRAME

(71) Applicant: Gunter Lang, Wernau (DE)

(72) Inventor: Gunter Lang, Wernau (DE)

( * ) Notice: Subject to any disclaimer, the term of this patent is extended or adjusted under 35 U.S.C. 154(b) by 202 days.

(21) Appl. No.: 14/360,055

(22) PCT Filed: Nov. 19, 2012

(86) PCT No.: PCT/EP2012/072946
§ 371 (c)(1),
(2) Date: Jul. 10, 2014

(87) PCT Pub. No.: WO2013/076027
PCT Pub. Date: May 30, 2013

(65) Prior Publication Data
US 2014/0329134 A1 Nov. 6, 2014

(30) Foreign Application Priority Data
Nov. 25, 2011 (DE) .......... 10 2011 055 719

(51) Int. Cl.
*H01M 6/42* (2006.01)
*H01M 2/10* (2006.01)
*B62M 6/90* (2010.01)
*B62J 9/00* (2006.01)

(52) U.S. Cl.
CPC .......... *H01M 2/1083* (2013.01); *B62J 9/005* (2013.01); *B62M 6/90* (2013.01); *B62K 2208/00* (2013.01); *H01M 2220/20* (2013.01)

(58) Field of Classification Search
CPC .................. H01M 2/1083; H01M 2220/20
See application file for complete search history.

(56) References Cited

U.S. PATENT DOCUMENTS 6,148,944 A * 11/2000 Adomi ................ B62M 6/90
180/206.4

FOREIGN PATENT DOCUMENTS

| DE | 1200155 | 9/1965 |
| DE | 202009011118 | 11/2009 |
| DE | 202010010522 | 10/2010 |
| DE | 202011001232 | 3/2011 |
| NL | 213242 | 3/1961 |

* cited by examiner

*Primary Examiner* — Jane Rhee
(74) *Attorney, Agent, or Firm* — Emch, Schaffer, Schaub & Porcello Co., L.P.A.

(57) ABSTRACT

The object is providing an energy storage device that can be attached to the frame of the bicycle without the need for using tools. This device is, on the one hand, not in the way while the rider is operating the bicycle, and on the other hand, a suitable solution for easy retrofitting action of conventional bicycles. The energy storage device includes a housing that has disposed therein at least one electrical connection is available on the housing that is accessible from the outside. This connection serves, on the one hand, for connecting an electrical consumer, particularly an electrical drive, to the electrical energy storage element; on the other hand, this connection can preferably also serve for recharging the electrical energy storage element. The at least one electrical energy storage element is preferably a rechargeable accumulator.

22 Claims, 6 Drawing Sheets

ENERGY STORAGE DEVICE TO BE MOUNTED ON A BICYCLE FRAME

BACKGROUND OF THE INVENTION

The invention relates to an energy storage device for attachment to a bicycle frame. The energy storage device serves, in particular, for supplying electrical energy to an electrical drive or auxiliary drive of a bicycle. To this end, the energy storage device includes rechargeable electrical energy storage elements for providing electrical energy.

An energy storage device is known, for example, from DE 20 2010 010 522 U1. For purposes of attaching the same to the bicycle frame, the energy storage device includes a housing that has a protruding link. The link is placed into an allocated groove-like depression in a frame pipe of the vehicle frame. While it is possible to achieve easy supporting action for the housing, which includes one or several electrical energy storage elements, on the bicycle frame in this manner, it is necessary, however, for the bicycle to have a correspondingly adapted shape. The arrangement of the electrical energy storage elements is therefore only suitable for use on specially designed bicycle frames. Retrofitting conventional bicycles with an electrical auxiliary drive and an energy storage device is not possible with this approach.

DE 20 2011 001 232 U1 proposes attaching the housing of the apparatus of the electrical energy storage device. The retaining means includes two attachment clamps that grip around a pipe of the bicycle frame. The housing of the energy storage device can be mounted to the retaining means that is fastened to the bicycle frame by means of the attachment clamps.

Further, DE 20 2009 011 118 U1 also discloses an energy storage device for attachment to a bicycle frame. The energy storage device has a triangular-like housing shape, whereby it can be disposed in the triangle that is formed by the frame of the bicycle frame. In the upper part thereof, the housing has a cylindrical opening that accommodates, when it is in the mounted state, the upper frame pipe of the frame triangle. The housing is designed in two parts, and wherein the cylindrical opening is open at one location over the total axial length thereof in the manner of a slot. For purposes of assembly, said slot can be expanded against the elastic force of the housing and placed over the upper bar of the frame. After the placement on the upper bar of the frame, the two housing sections once again yield elastically toward each other, whereby the slotted cylindrical opening is clamped in place to the upper frame pipe. A storage battery and/or a control unit is/are then disposed in the frame triangle between the frame pipes.

This configuration suffers from the disadvantage in that it engages in the space between the frame pipes and frame triangle of the bicycle frame. Indeed, that location often accommodates retaining means for drinking bottles, spring-damper elements on shock-mounted bicycles, or the like. In this case, it would be necessary to disassemble these units first, prior to being able to attach the energy storage device according to DE 20 2009 011 118 U1 to the bicycle frame.

SUMMARY OF THE INVENTION

Using these known devices as a starting point, one object underlying the present invention shall be the task of providing an energy storage device that can be attached to the frame of the bicycle without the need for using tools, and that is, on the one hand, not in the way while the rider is operating the bicycle, and that is, on the other hand, a suitable solution for easy retrofitting action of conventional bicycles.

This object is achieved by an energy storage device having the characteristics as specified in claim 1.

The energy storage device according to the invention includes a housing that has disposed therein at least one electrical energy storage element for providing electrical energy. At least one electrical connection is available on the housing that is accessible from the outside. This connection serves, on the one hand, for connecting an electrical consumer, particularly an electrical drive, to the electrical energy storage element; on the other hand, this connection can preferably also serve for recharging the electrical energy storage element. The at least one electrical energy storage element is preferably a rechargeable accumulator.

The housing includes two hollow housing sections that are rigidly connected to each other by means of a connecting piece. The two housing sections serve for accommodating at least one electrical energy storage element. Preferably, a plurality of electrical energy storage elements is disposed in each of the two housing sections. A mounting space is defined between the two housing sections. The space between the two housing sections is predetermined by the connecting piece and constitutes the width of the mounting space. The width of the mounting space is at least as large as the width of the pipe section that is to be accommodated on the bicycle frame in the mounted state.

On a housing configuration of this kind, it is possible to simply place the energy storage device from above over the upper frame pipe of the bicycle frame. The connecting piece then rests preferably only at one point on the upper frame pipe, and the two housing sections extend on both sides of the upper frame pipe and/or of the bicycle frame, away from the connecting piece and downward. The two housing sections do not protrude into the frame triangle and/or in the space between the frame pipes of the bicycle frame. In particular, the two housing sections are disposed outside of the space between two parallel planes, the spacing between which corresponds to the thickness of the frame pipe of the bicycle frame, and between which the bicycle frame is disposed. A retaining means at this location for holding a drinking bottle, a spring-damper means of the bicycle, or the like is therefore not in the way of mounting the energy storage device. Moreover, it is also not necessary to adapt the housing shape of the energy storage device to the shape of the bicycle frame. The energy storage device is suitable for use in connection with the most varied frame constructions and sizes of a bicycle. The connecting piece preferably rests on a supporting point on top of the upper frame pipe and is detachably fastened to the bicycle at this attachment point, particularly to the saddle support pipe of the bicycle frame. The connecting piece can extend, self-supporting, between the supporting point and the attachment point, maintaining a space in relation to the bicycle frame.

Preferably, the upper frame pipe and a lower frame pipe, with the latter extending at an incline relative to the upper frame pipe and below the same, traverse the mounting space, which is where the housing supports itself to avoid any pivoting motion about a longitudinal axis. The housing is preferably mounted by the rear end thereof to a point on the vehicle frame that is located, in particular, above the upper frame pipe. It is possible for the housing to rest upon the upper frame pipe at a further location. This means that the housing is correspondingly supported in a horse-riding-like fashion, similarly to a saddle bag, above the upper frame pipe of the bicycle frame. The two housing sections are held in a spaced position, such that they do not engage in the triangle of the bicycle frame, when they are in the mounted state.

Advantageously, the two housing sections have an identical shape and/or size. In particular, the housing is configured as symmetrical regarding the longitudinal middle plane through the mounting space. Identical structural parts can therefore be used for creating the two housing sections. The housing sections are preferably of equal weight to avoid disturbing the equilibrium of the bicycle, while it is being ridden.

The two housing sections can also be supported on the connecting piece with the capacity for longitudinal displacement.

In a preferred embodiment, a plurality of electrical energy storage elements is disposed inside each housing section. In particular, it is possible to configure all electrical energy storage elements identically. In the preferred embodiment, each of the electrical energy storage elements is designed as a rechargeable accumulator cell. The electrical energy storage elements can be connected in series or in parallel relative to each other. Combinations of series and parallel connections are possible as well. Providing a series connection of a plurality of electrical energy storage elements will increase the available charge storage capacity for an electrical consumer and/or the energy storage capacity that is available at a given electrical voltage. This helps extend the operating life of the electrical consumer.

Preferably, each housing section includes two housing shells that are connected to each other. Each housing shell can have, for example, an all-around circumferential rim with a contact surface, and wherein the two housing shells that constitute one housing section rest against each other by contact surfaces that face each other. The two housing shells define a cavity that has the at least one electrical energy storage element disposed therein. The two housing sections and/or the two housing shells of a housing section can be made of a hard plastic material to protect the at least one electrical energy storage element against damage in the event of an accident or a fall. Alternately, the two housing sections can also be made of metal or of a composite material.

In particular, the housing shells are detachably connected to each other such as, for example, by means of a plurality of locking pieces. A flange can be provided in sections along the rim of the housing shells on the side facing away from the contact surface. Preferably, each locking piece includes a locking groove with a groove opening that is narrower than the width of the groove channel following thereafter, where the two flanges of the two housing shells are disposed, after the connection has been established. The result is a connection between the housing shells that is very easy to achieve and very easy to release and, moreover, without the need for tools.

In a preferred embodiment, the connecting piece includes two longitudinal grooves extending parallel in longitudinal direction in relation to each other, and each having a groove opening that is narrower than the groove channel following thereafter. At least one locking piece can have a retaining protrusion on the side thereof that faces away from the housing section and engages in one of the longitudinal grooves, when the connection has been established with the connecting piece. Preferably, the retaining protrusion includes a first link that is connected to the locking piece and a second link that extends away from the first link only on one side. With this arrangement, it is possible to release one housing section from the connecting piece by a pivoting motion about a swing axis that extends parallel in relation to the longitudinal groove. The connecting piece can thus remain fastened to the bicycle, when the housing section is removed.

In one embodiment, the connecting piece can be connected at two points, and particularly only at these two points, to the bicycle. For example, it can rest against a first point on a frame pipe of the bicycle frame, and it is fastened using a fastening means above the upper frame pipe of the bicycle frame, for example, to a saddle support pipe and/or a saddle support that is accommodated in the saddle support pipe.

The connecting piece is preferably configured as a plate. In one preferred embodiment, it serves only for connecting the two housing sections to each other and to the bicycle frame. No electrical energy storage element is disposed inside the connecting piece. In one simple embodiment, the connecting piece can be configured as a solid plastic plate. Preferably, the housing is U-shaped, wherein the two housing sections are disposed approximately parallel relative to each other with a space there-between, and they are connected to each other by the connecting piece at the, when in the mounted position, upper side, which is, so to speak, a crosswise leg extending between the two housing sections.

In one preferred embodiment, the electrical connection is embodied by at least one connecting cable that exits from the housing. Preferably, at least one connecting cable exits from each housing section, particularly at one of the two front sides of the housing. The front sides of the housing are oriented forward and/or backward in the mounted state. By arranging the electrical connection and/or providing for the electrical connection cable on one of the two front sides, the electrical connection is easily accessible and can be connected to the electrical drive means, and particularly a control unit of the electrical drive means, and/or the electrical motor of the electrical drive means.

Advantageous configurations of the invention can be derived from the dependent claims and from the description of the figures. The description is limited to the essential characteristics of the present invention, as well as other features. The drawings are intended as a supplement in further illustrating the invention. Shown are as follows:

IN THE DRAWINGS

DETAILED DESCRIPTION OF THE INVENTION

Figure 1:
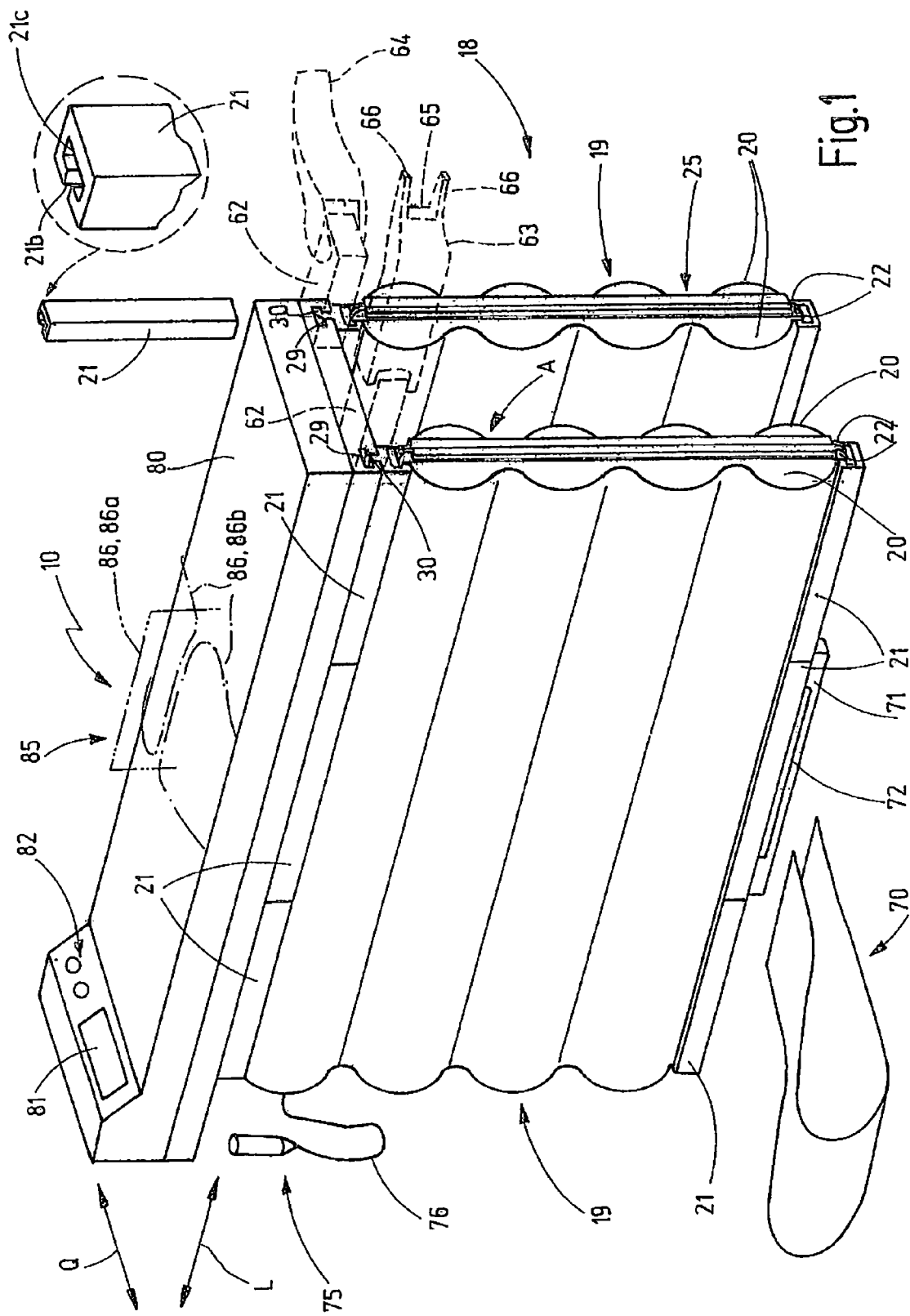
FIG. 1 is a representation of one embodiment of the energy storage device, seen in a schematic perspective view.

The present invention relates to an energy storage device 10, as shown in the drawings. The energy storage device 10 is provided and set up to be detachably mounted to a bicycle frame 11 and, as seen in the embodiment, without the use of any tools. The energy storage device 10 includes at least one, and in the embodiment several, rechargeable electrical energy storage elements 12, which are constituted of accumulator cells 13 in the embodiment. The rechargeable electrical energy storage elements 12 serve to provide an electrical consumer with electrical energy such as, for example, an electrical drive or auxiliary drive of a bicycle.

The energy storage device 10 includes a housing 18, and the electrical energy storage elements 12 are disposed therein. Two identically configured housing sections 19 are present for accommodating the electrical energy storage elements 12. Each housing section 19 includes two housing shells 20 that are disposed resting against each other. In the embodiment, the two housing shells 20 of a housing section 19 are detachably connected to each other. This can be achieved, for example, by means of a positive and/or non-positive connection with the aid of locking pieces 21. At least one locking piece 21 is present on each straight side of a housing section 19. Not all locking pieces 21 are shown in the drawing for reasons of better clarity. Adjacently disposed locking pieces 21 can rest against each other, or they can be disposed as spaced in relation to each other.

Each housing shell 20 includes an all-around circumferential rim 22. A contact surface 23 is provided on each rim on the sides of the two housing shells 20 that face each other, resting against each other, when the connection between the two housing shells 20 has been established. It is possible to insert an all-around circumferential sealing element in the area of the two contact surfaces 23 between the two housing shells 20 to prevent water or moisture from penetrating the housing section 19.

On the side of the rim 22 that is opposite the contact surface 23, the rim 22 of a housing shell 20 is, in sections thereof, provided with a flange 24 that extends away from the contact surface 23 in a crossways manner. In the corner areas of each housing shell 20, the rim 22 is configured without a flange. If the two housing shells 20 of one housing section 19 come to rest against each other, the two rims 22 and the two flanges 24 constitute a T-shaped locking element 25, when seen together. This way, it is possible to create a preferably continuous locking element 25 on the four sides of each housing section 19. Each locking element 25 is held together by at least one locking piece 21, which is allocated thereto, in a positive and/or non-positive closure, whereby the two housing shells 20 are pressed together.

For this purpose, the locking piece 21 includes a locking groove 21a with a slot-shaped groove opening 21b. The locking groove 21a is incorporated in a block-shaped part of the locking piece 21 and traverses the locking piece 21 completely. When the locking piece 21 only has the function of securing the housing shells 20 against each other, the block-shaped part constitutes the locking piece 21. The groove opening 21b of the locking groove 21a opens in a groove channel 21c. The groove opening 21b is narrower than the groove channel 21c, when seen via the cross-section of the locking groove 21a. The groove channel 21c serves for accommodating a section of the two flanges 24 that are allocated thereto, while the groove opening 21b serves for accommodating the allocated section of the two rims 22. This means that the locking groove 21a has a T-shaped cross-section. After the connection with a housing section 19 has been established, the locking piece 21 grips around the two allocated sections of the flange 24 of the two housing shells 20 pressing them against each other. Due to the fact that the corner areas of the two housing shells 20 are free of any flanges, the locking pieces 21 can be pushed onto the flange 24 coming from the corner areas in order to secure the two housing shells 20 against each other. The housing section 19 can thus be closed and/or opened without the use of any tools.

The two housing shells 20 enclose a cavity on the inside of each of the housing sections 19. The accumulator cells 13 are disposed inside this cavity, which can, as envisioned according to the embodiment, be subdivided into a plurality of chambers 26; and the accumulator cells 13 are supported substantially immovably in relation to the allocated housing section 19 therein. For this purpose, the chambers 26 of a housing section 19 are adapted to the contour of the accumulator cell. In the embodiment according to FIGS. 1 and 2, the accumulator cells 13 have a cylindrical shape, which is why the chambers 26 are also configured approximately cylindrically. The housing section 19 is tapered between two adjacent chambers 26. This is how the housing section 19 acquires a wave-like exterior surface with a convex arch, respectively, in the areas of the chambers 26 and a concave indentation between the two chambers 26 that are disposed adjacently in relation to each other. In the embodiment according to FIG. 3, the exterior surfaces of the housing section 19 are configured as substantially flat. The form design of the housing shells 20 and the housing sections 19 can be executed in different variations. This is how the shape of the housing shells 20 and/or the housing sections 19 can be adapted to the shape of the electrical energy storage elements 12 that are accommodated inside the chambers 26, particularly in an effort of using a minimum amount of material in order to achieve a minimum of weight of the housing 11. All chambers 26 of a housing section 19 constitute the cavity of the housing section 19.

The housing 18 includes a connecting piece 28 that is formed by a plate in the embodiment. The connecting piece 28 is made of a rigid material and determines the size of the space between the two housing sections 19, in a crossways direction Q at a right angle relative to a longitudinal direction L.

The connecting piece 28 contains two longitudinal grooves 29, running parallel in relation to each other, and that are incorporated therein. The longitudinal grooves 29 serve for detachably connecting the two housing sections 19 to the connecting piece 28. The longitudinal grooves 29 are open, seen in the longitudinal direction L, at least on one crossways side of the connecting piece 28. In the embodiment, the longitudinal grooves 29 extend completely along the longitudinal direction L though the connecting piece 28. Each longitudinal groove 29 includes a slot-like groove opening 29a as well as a groove channel 29b that follows directly thereafter. Seen via the cross-section, the groove opening 29a is narrower than the groove channel 29b. This way, the longitudinal groove 29 obtains a T-shape or L-shape; it depends on whether, seen via crossways direction Q relative to the groove opening 29a of the longitudinal groove 29, the wider groove channel 29b extends away from the groove opening 29 in the crossways direction Q only on one or on both sides.

According to the embodiment, one or the plurality of locking pieces 21, respectively, serve for connecting the two housing sections 19 to the connecting piece 28, which have on the side that is opposite to the groove opening 21b of the closure groove 21a a holding protrusion 30, which engages, when the connection has been established, in an allocated longitudinal groove 29 in the connecting piece 28. The holding protrusion 30 is L-shaped, when seen via the cross-section thereof. It includes a first link 30a that is connected to the connecting piece 21. The first link 30a extends crossways away from the connecting piece 21. A second link 30b extends crossways and, in particular, at a right angle from the first link 30a, away on one side of the first link 30a. It is possible to provide a rounding R in the transitional area between the two links 30a, 30b by which the two links 30a and 30b transition into each other. The second link 30b is oriented such that it is preferably oriented in a crossways direction Q, away from the respectively other longitudinal groove 29 and toward the outside.

Figure 3:
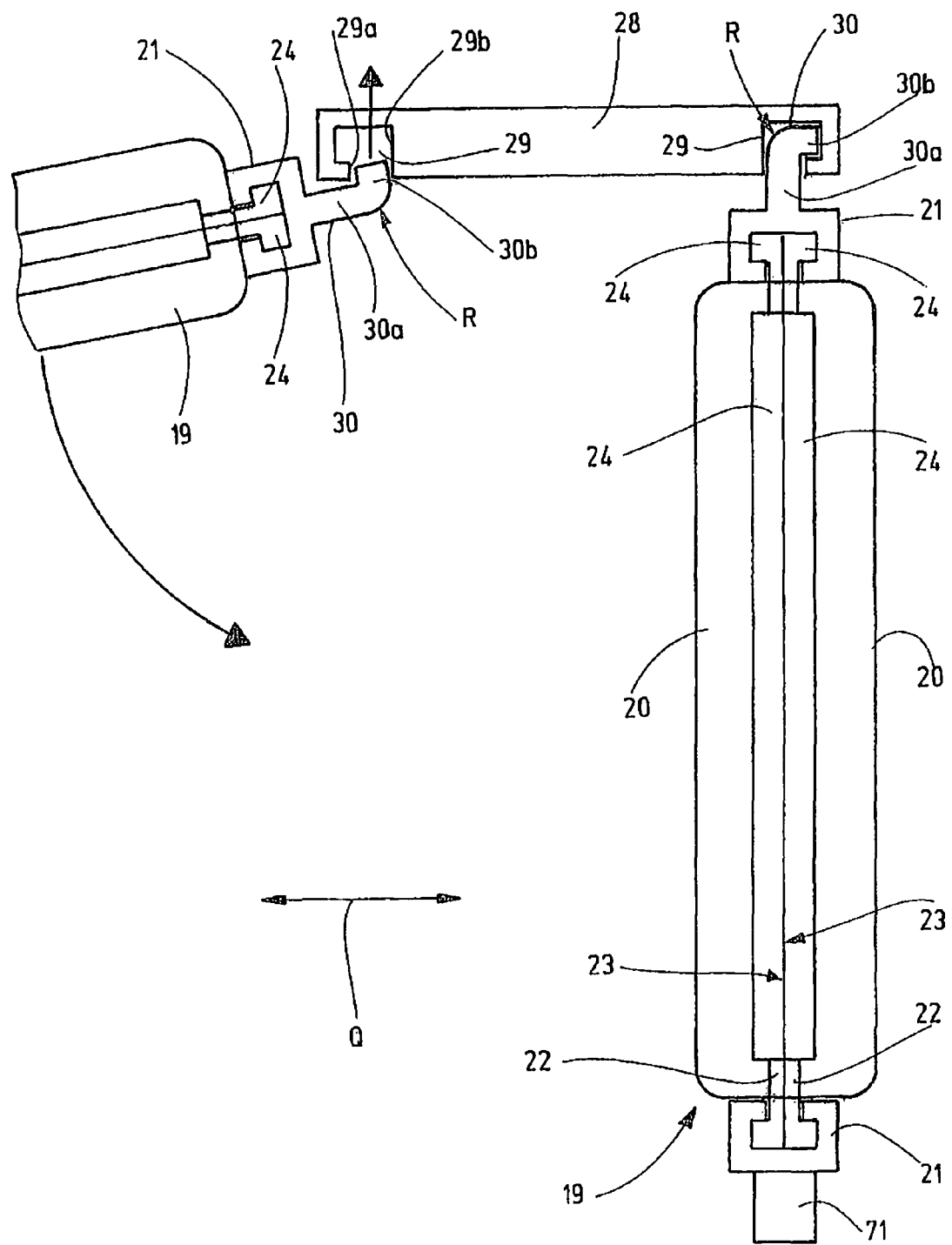
FIG. 3 is a representation of a modified embodiment of the energy storage device, seen in a rear view through the mounting space between the two housing sections.

By this configuration, it is possible to establish, utilizing the locking pieces 21 that are provided with a holding protrusion 30, a detachable connection between the housing section 19 and the connecting piece 28. To this end, the two links 30b are first inserted through the groove opening 29a of the longitudinal groove 29, and the housing section is subsequently pivoted about a swing axis that extends in the area of the groove opening 29a of the longitudinal groove 29 in the longitudinal direction L (FIG. 3). With this pivoting motion, the second link 30b reaches the groove channel 29b of the longitudinal groove 29, and the first link 30a traverses the groove opening 29a of the longitudinal groove 29. The housing section 19 can thus no longer fall through the groove opening 29a and out of the longitudinal groove 29. To release the connection, the housing section 19 is pivoted away once more from the respective other housing section 19, until it is possible to remove the second link 30b through the groove opening 29a of the longitudinal groove 29.

The housing sections 19 can be positioned as displaceable in the longitudinal direction L inside the longitudinal groove 29. To prevent any inadvertent displacement of the housing sections 19 in the respective longitudinal groove 29, it is possible to detachably mount one stop element 31 each on the two sides of a respective housing section 19, as shown schematically in FIG. 4.

Figure 8:
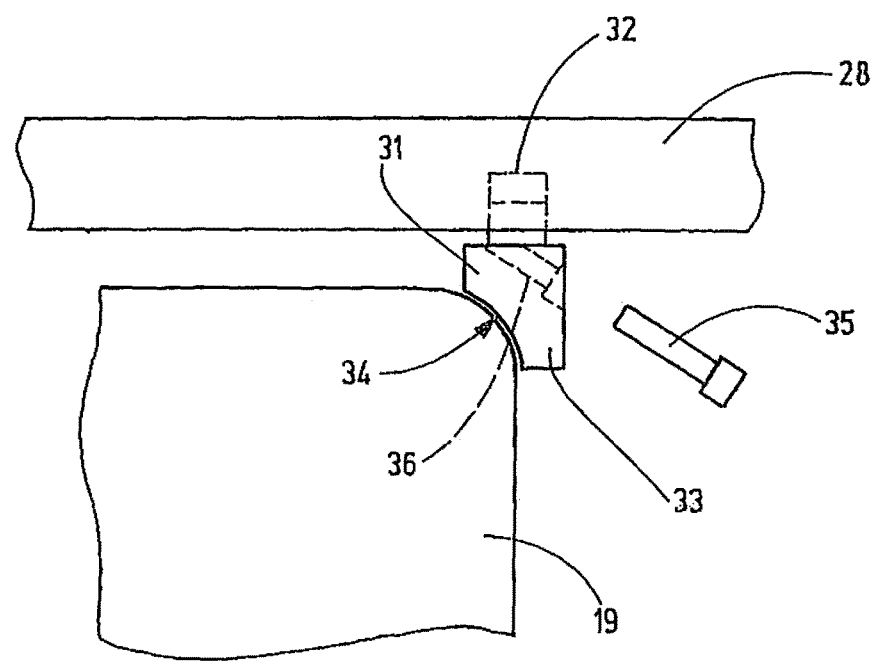
FIG. 8 is a schematic depiction of a stop element for securing a housing section of the energy storage device to a connecting piece to protect against displacement in the longitudinal direction.

FIG. 8 depicts an enlarged view of a stop element 31. In the embodiment, the stop element 31 is inserted into the allocated longitudinal groove 29 by means of a groove piece 32. The groove piece 32 preferably has, seen via a cross-section thereof, the shape of an L or T. Outside of the longitudinal groove 29, the stop element 31 includes a stop body 33 that rests against the housing section 19 for the purpose of securing the housing section 19 against being displaced in the longitudinal direction L. Preferably, the stop body 33 includes a concavely curved stop surface 34 for this purpose, whose curvature corresponds approximately to the curvature of the rims 22 in a corner area. In the embodiment, the stop surface 34 is applied to the two rims 22 and/or the flange 24 of the allocated housing section 19. The shape of the contact body 33 is adapted to the shape of the allocated area of the housing section 19. A lock screw 35, which traverses a lock bore 36 in the stop element 31, secures the stop element 31 by means of a non-positive closure in the longitudinal direction L on the connecting piece 28. To this end, the lock bore 36 can include an internal thread, and the lock screw 35 can be screwed into this bore. The free end of the lock screw 35 can press against the connecting piece 28, such that the groove piece 32 of the stop element 31 braces itself in the longitudinal groove 29.

The plate-like connecting piece 28 maintains the spacing between the two housing sections 19, such that a mounting space A is formed between the two housing sections 19. In the mounted state, when the device is attached on the bicycle, the mounting space A serves to accommodate parts of the bicycle frame 11, and particularly one or a plurality of the pipe sections 37, 38. Due to the rigid connection of the two housing sections 19 that is achieved by the connecting piece 28, the width B of the mounting space A is constant prior to, during and after the attachment of the device to the bicycle frame 11, at least in the area of the connecting piece 28.

In the embodiment, the housing 18 is configured as symmetrical in relation to the longitudinal middle plane. In the longitudinal direction L, the longitudinal middle plane extends through the center of the mounting space A. The longitudinal plane is oriented at a right angle in relation to the connecting piece 28.

The width B of the mounting space A is at least as large as the width of the at least one pipe section 37, 38 of the bicycle frame 11 to be accommodated inside the mounting space A. The width B is understood as the distance between the two housing sections 19. In the embodiment, this distance is measured at a right angle in relation to the longitudinal direction L in the crossways direction Q.

Figure 2:
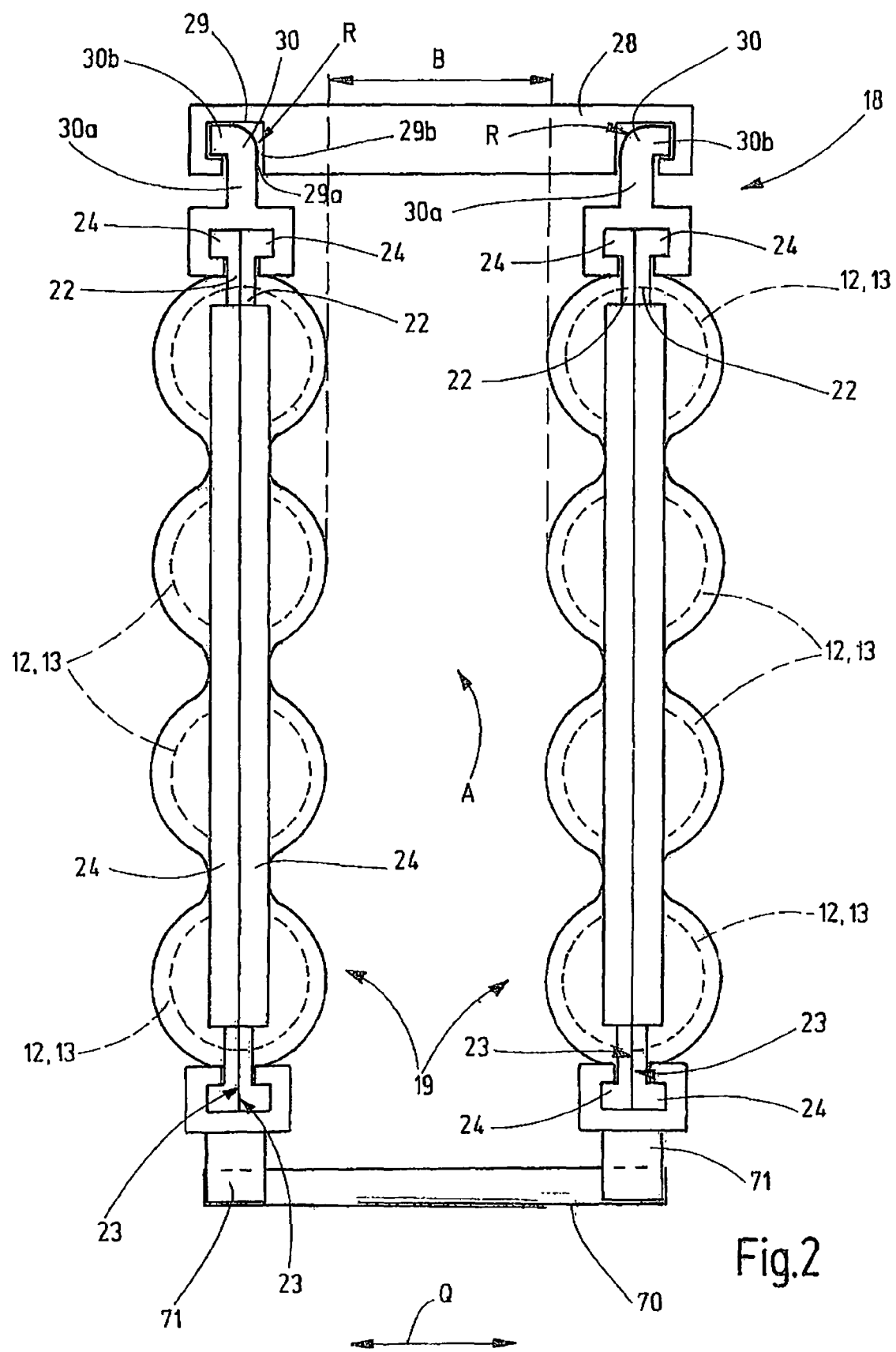
FIG. 2 is a representation of the embodiment of the energy storage device from FIG. 1, seen in a rear view through the mounting space between the two housing sections.

In the embodiment according to FIGS. 1 and 2, the width B is not constant owing to the arching and waisting of the two housing sections 19. Width B is understood as the minimum distance between the two housing sections 19. The width B is therefore defined as the distance between two planes that extend, as slightly sloping or parallel relative to each other, and touch one surface of a housing section, respectively, that is oriented toward the mounting space A without intersecting this area, and wherein the two planes are disposed such that the distance between them reaches a maximum. The width of the pipe sections 37, 38 is measured in the crossways direction Q and with a vertical arrangement of the bicycle frame 11.

As seen in an exemplary fashion, the connecting piece 28 is connected to the bicycle frame 11 only at two points. In the embodiment, the bicycle frame 11 includes an upper frame pipe 45 that is connected by one end thereof to the saddle support pipe 46 and by the other end thereof to the handle bar pipe 47. The saddle support pipe 46 serves to accommodate the saddle support 44 of the bicycle that carries the saddle, the handle bar pipe 47 constitutes the receptacle for the steering support, where the handle bar is fastened. A lower frame pipe 48 is disposed below the upper frame pipe 45, connecting the handle bar pipe 47 to a bottom bracket receptacle 49. The saddle support pipe 46 is also connected to the bottom bracket receptacle 49. Alternately in relation to the depicted shape of the frame, the upper frame pipe 45 can conceivably also connect the saddle support pipe 46 to the lower frame pipe 48, thereby creating a so-called Y-frame.

Figure 5:
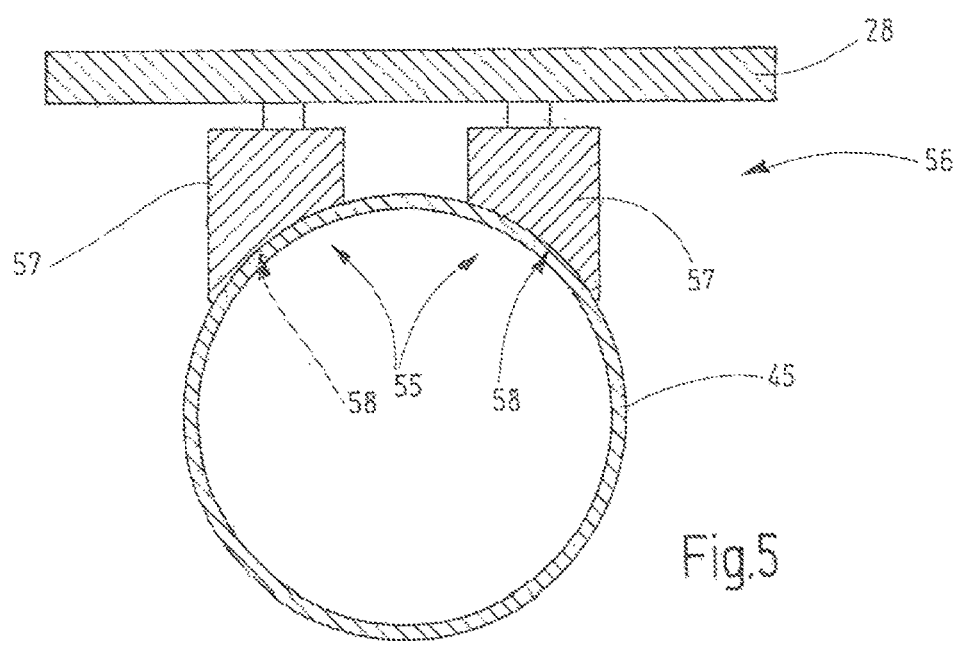
FIG. 5 is a representation of a schematic sectional view of a supporting means by which a connecting piece of the energy storage device supports itself on a frame pipe of a bicycle frame.

On the underside that faces the mounting space A, the connecting piece 28 includes a supporting means 56 at the support point 55. It is by this supporting means 56 that the connecting piece 28 supports itself on the bicycle frame 11 and on the upper frame pipe 45. The supporting means 56 is illustrated by way of a schematic depiction in FIG. 5. As shown in an exemplary fashion, the supporting means 56 includes two support bodies 57 that are disposed next to each other in the crossways direction Q and connected to the underside of the connecting piece 28. The two supporting bodies 57 can have, for example, a cylindrical-like shape. On the side that is oriented toward the upper frame pipe 45, the two sectional bodies 57 each have a supporting surface 58, by which they rest against the upper frame pipe 45. The supporting surface 58 can be concavely curved and thereby adapted to the curvature of the upper frame pipe 45. Alternately, the supporting surface 58 can also be flat, when no load is applied to the supporting body 57. The supporting body 57 is preferably made of an elastic material such as, for example, rubber. The elasticity of the sectional body 57 is selected such therein that, when in the position of use, the same is deformed by the weight of the energy storage device 10 and thus completely or partially adapted to the curvature of the upper frame pipe 45. This way, it is possible to use the same supporting bodies 57 for differently shaped and curved upper frame pipes 45. As illustrated in FIG. 5, when starting from the longitudinal middle plane, the height of the two sectional bodies 57 increases in the crossways direction Q, when viewed through the upper frame pipe 45.

Figure 6:
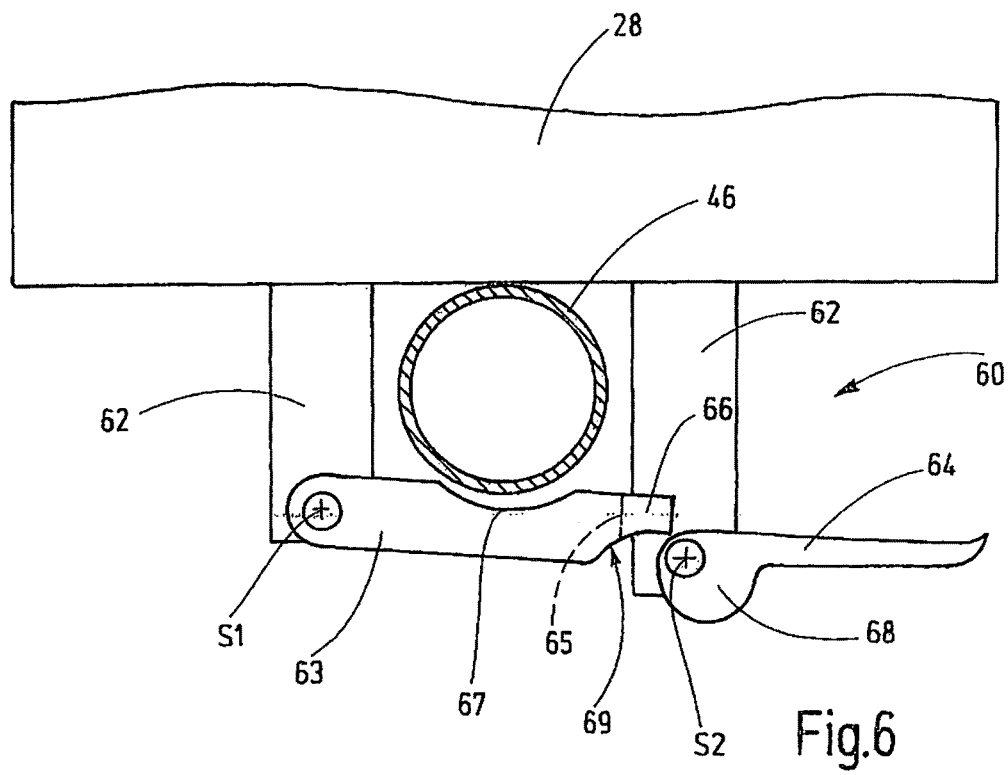
FIGS. 6 and 7 are schematic depictions, respectively, of an attachment means for mounting a connecting piece of the energy storage device to the bicycle.
Figure 7:
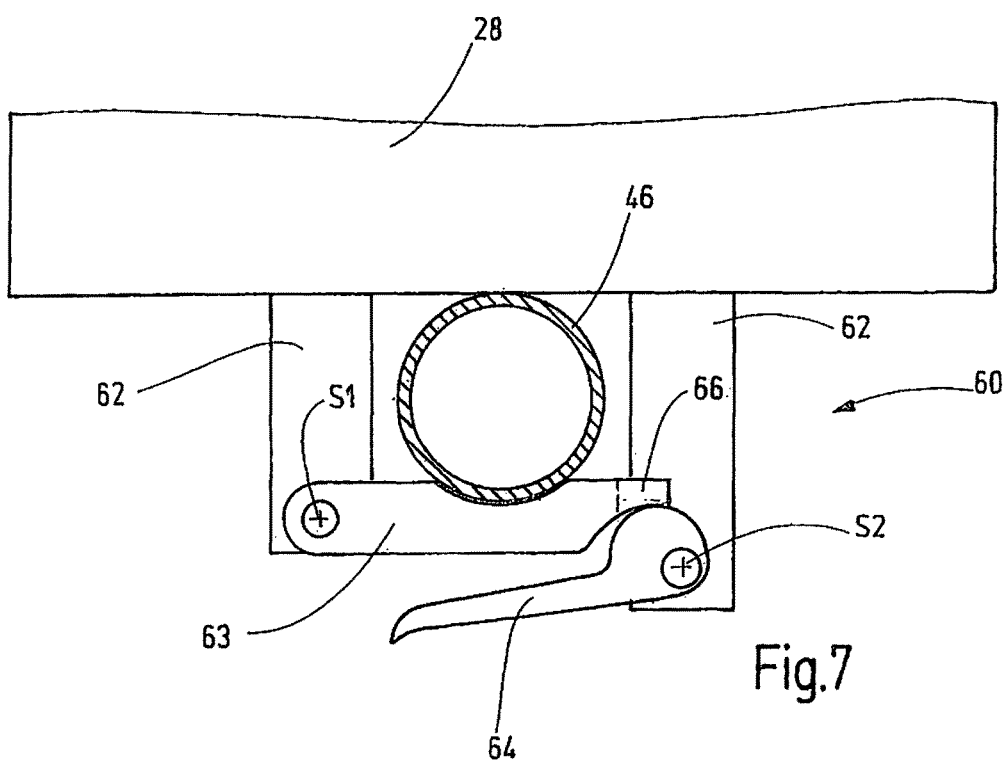

In addition to the support point 55, an attachment means 60 is used for detachably mounting the connecting piece 28 by way of a positive and/or non-positive closure above the upper frame pipe 45 to the bicycle frame 11 to a fastening point 61, particularly to the saddle support pipe 46 and/or the saddle support 44. One embodiment of an attachment means 60 is illustrated in FIGS. 6 and 7. In FIG. 1, the fastening means is hinted at by perforated lines to facilitate the clear depiction of the other parts of the housing 18.

In the embodiment, the attachment means 60 includes two carrying parts 62 that are mounted to the rear of the connecting piece 28 allocated to the saddle support pipe 46 and/or the saddle support 44. In the longitudinal direction L, the two carrying parts 62 extend away from the connecting piece 28; in the crossways direction Q, they are disposed as spaced relative to each other. The saddle support pipe 46 and/or the saddle support 44 can thus extend through the two carrying parts 62.

A pivoting lever 63 is supported on the free end of the one carrying part 62 with the ability to pivot about the first swing axis S1. The first swing axis S1 extends crossways in relation to the longitudinal direction L and crossways in relation to the crossways direction Q. A clamping lever 64 is supported on the free end of the other carrying part 62 with the ability to pivoting about a second swing axis S2. The second swing axis S2 extends parallel in relation to the first swing axis S1. The pivoting lever 63 has a recess 65 in the free end thereof that is opposite to the first swing axis S1, such that the free end of the pivoting lever 63 is configured in a fork-like fashion having two prongs 66 that are spaced by the recess 65 in relation to each other. The length of the pivoting lever 63 is selected such that, when the same is in the closed position, it bridges the distance between the two carrying parts 62, and wherein the carrying part 62 that supports the clamping lever 64 engages in the recess 65 of the pivoting lever 63. On the side that faces the pipe 46 or pipe 44, the pivoting lever 63 includes a fastening surface 67 that can be concavely curved in order to adapt to the curvature of the allocated pipe 46, 44.

The clamping lever 64 includes a clamping section 68 that is disposed eccentrically relative to the second swing axis S2. By way of the eccentric clamping section 68 of the clamping lever 64, it is possible to apply a clamping surface 69 to the pivoting lever 63. The clamping surface 69 can be concavely curved. The clamping surface 69 is provided in the area of the free end of the pivoting lever 63.

When the pivoting lever 63 has been brought into the closed position thereof, where it rests by the fastening surface 67 thereof against the saddle support pipe 46 and/or the saddle support 44, the clamping lever 64 can subsequently be pivoted about the second swing axis S2, and wherein, in the presence of continuous pivoting action, the eccentric clamping part 68 approaches the clamping surface 69 and applies clamping action thereto. This is how the clamping force is generated between the eccentric clamping 68 and the free end of the pivoting lever 63. In the meantime, the energy storage device 10 braces itself between the connecting piece 28 and the pivoting lever 63 on the saddle support pipe 46 and/or the saddle support 44 and is held in place at the fastening point 61.

The attachment means 60 is released by reversing the order in which these steps are performed.

The energy storage device 10 includes, moreover, a further attachment means 70. In the embodiment, this fastening means is constituted of a belt, rope or similar flexible strength member. As illustrated in FIGS. 1 to 3, it is possible to provide an attachment means 70 in the manner of, as seen in an exemplary fashion, a Velcro strap. The attachment means 70 is connected to the bottom ends of the two housing sections 19 opposite the connecting piece 28, such that the same cannot be pivoted away from each other. This prevents that a housing section 19 from inadvertently coming loose from the connecting piece 28.

For mounting the attachment means 70 that is configured as a Velcro band, it is possible to provide a slotted protrusion 71 at least on one locking piece 21 of each housing section 19 that is disposed on the side of the housing section 19 opposite to the connecting piece 28. The attachment means 70 can be guided through the two slots 72 of the two protrusions 71 and locked, for example, by means of the Velcro closure. Instead of the slotted protrusion 71 and the Velcro strap, it is possible to envision any other kind of attachment means 70, as well as any other correspondingly adapted modalities for mounting the attachment means 70 to one of the locking pieces 21 of each housing section 19.

Preferably, the energy storage device 10 is positioned in such a manner on the bicycle frame 11 that the attachment means 70 is in contact with the lower frame pipe 48 of the vehicle frame 11. Due to this step, it is possible to exercise a certain pulling force on the connecting piece 28 via the attachment means 70 and the lower frame pipe 48, such that the same presses against the upper frame pipe 45 at the support point 55. This way, it is possible to achieve a very good hold overall of the energy storage device 10 on the bicycle frame 11.

When in the mounted state, the two housing sections 19 extend on both sides of the triangular frame constituted of the upper frame pipe 45, the lower frame pipe 48 and the saddle support pipe 46, starting from the connecting piece 28 and downward. No housing section 19 engages therein in the triangular frame and/or in the area between the two frame pipes 45, 46, 48. In this position, a first pipe section 37 of the upper frame pipe 45 as well as a second pipe section 38 of the lower frame pipe 48 traverse the mounting space A between the two housing sections 19.

Further, an electrical connection 75 is also provided on the housing 18 that is constituted, in the embodiment, of at least one electrical connection cable 76. An electrical connection cable 76 is envisioned on each of the housing sections 19; wherein FIG. 1 only illustrates one such connection 75. The electrical connection cables 76 are disposed on one of the two front sides of the housing 18. In the attached state, the front side, which is provided with the connection cables 76, is oriented forward. The electrical connection 75, constituted of the electrical connection cables 76, serves for establishing an electrical connection between the at least one electrical energy storage element 12 and an electrical consumer such as, for example, a control unit of an electrical drive, or a charging device for recharging the electrical energy storage element 12. If several separate electrical energy storage elements 12 are disposed, for example, the accumulator cells 13 inside the housing 18, the same can be disposed in a parallel or series connection. It is also possible to connect a part of the electrical energy storage elements 12, respectively, which are parallel in such a parallel connection, in series, or it is possible to connect a plurality of series connections of electrical energy storage elements 12 in parallel, thus obtaining mixed forms of series and parallel connections.

As a variation of the depicted embodiment, it is possible to provide inside the housing 11, aside from the at least one rechargeable electrical energy storage elements 12, electrical and/or electronic components. For example, electrical and/or electronic, controlled switches 41 can be envisioned as well for modifying the electrical connection of the electrical energy storage element 12 and/or the accumulator cells 13, and that can be picked off via the connection 75.

Figure 4:
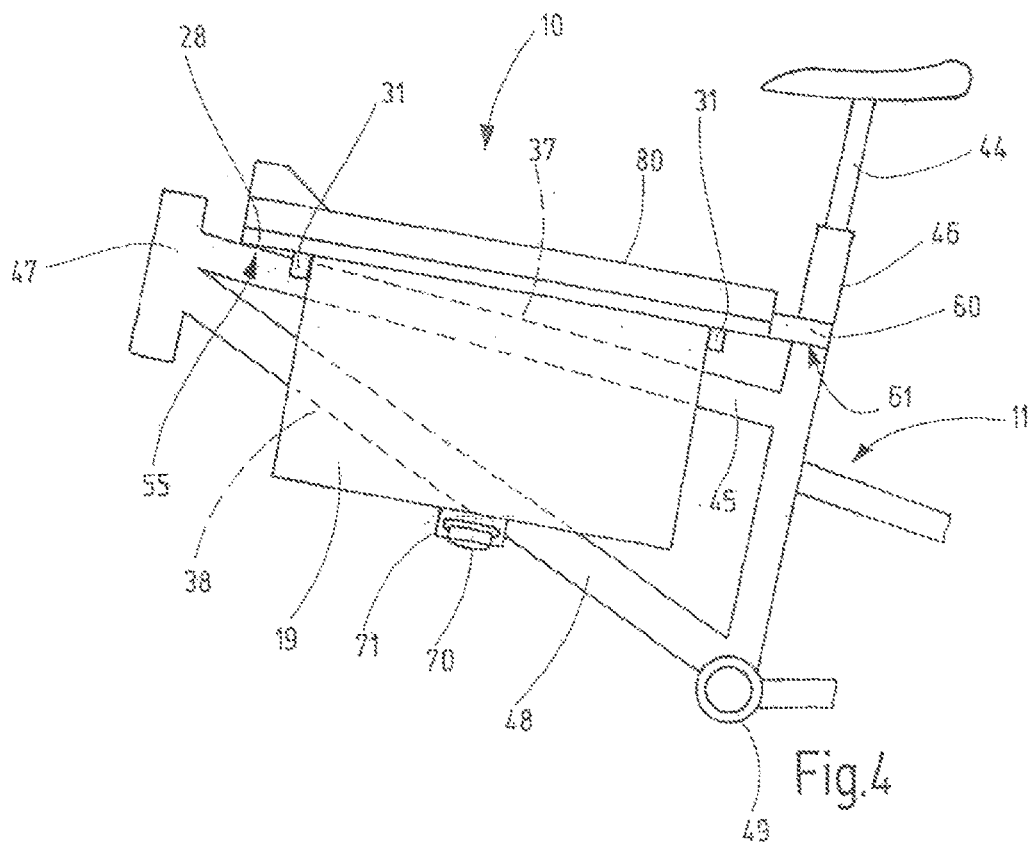
FIG. 4 is a representation of the energy storage device according to any one of the FIGS. 1 to 3, seen in a schematic side view and attached to the bicycle frame.

In the embodiment, the control unit for controlling an electrical bicycle drive is disposed inside a housing 80, as illustrated schematically in FIGS. 1 and 4. The housing 80 is seated on the upper side of the connecting piece 28 that faces away from the mounting space A. Various electrical and/or electronic components can be disposed inside the housing 80 for providing drive control of the electrical bicycle drive. In addition, the housing 80 can also include a display 81 and/or at least one operating element 82. Using the operating element 82, it is possible, for example, to activate or deactivate the electrical drive. The display 81 can inform the driver of up-to-date data, such as, for example the charging state of the electrical energy storage element 12, the current power output of the electrical drive, the expectedly remaining duration of availability of electrical energy, the expected range, or the like. The display 81 and/or the operating element(s) 82 can be disposed, for example, on a slanted surface of the housing 80 that is oriented toward the rider. On the upper side of the housing 80 that is disposed opposite to the connecting piece 28, it is also possible to envision a cushioning means for protecting the rider against injury and/or to provide, as an alternate solution to the saddle, a further seat position.

The energy storage device 10 can, moreover, include a carrying means 85 for simplified handling, such that, for example, it is possible to take hold of the energy storage device 10 for attaching and detaching the same to and from the bicycle by one hand, and/or for carrying the energy storage device 10 (FIG. 1). The carrying means can include one or a plurality of handle grips 86. The at least one handle grip 86 is preferably mounted on the housing 80. It can be mounted on the housing 80 with a fold-over or removal capacity. The at least one handle grip 86 can be configured as a rigid body 86a or as a flexible tab 86b. It is possible to provide one handle grip 86 along the middle longitudinal plane on the housing 80 or two handle grips 86 on both sides of this middle longitudinal plane, which can be grasped jointly by one hand.

The invention relates to an energy storage device 10 with a plurality of rechargeable electrical energy storage elements 12 that are configured as accumulator cells 13 and that can be detachably mounted in a tool-free manner to the bicycle frame 11. The electrical energy storage elements 12 supply an electrical drive and/or auxiliary drive of the bicycle with electrical power. The electrical energy storage elements 12 are disposed inside a housing 18. The housing 18 includes two completely closed housing sections 19, wherein the one half of the electrical energy storage elements 12 is disposed in one housing section 19 and the other half of the electrical energy storage elements 12 is disposed in the other housing section 19. All of the electrical energy storage elements 12 are identical in relation to each other. The two housing sections are rigidly connected leaving a space there-between via a connecting piece 28 of the housing 18, such that a mounting space A is created between the two housing sections 19, adjacently to the connecting piece 28. For mounting purposes, the housing 18 is placed over a frame pipe 45 of the bicycle frame 11, such that one or preferably two frame pipe sections 37, 38 traverse the mounting space A and that the energy storage device 10 is thus supported on the bicycle frame 11. The two housing sections therein do no engage in the space between the two frame pipes 45, 46, 48 of the bicycle frame 11.

LIST OF REFERENCE SIGNS

10 Energy storage device
11 Bicycle frame
12 Electrical energy storage elements
13 Accumulator cell
18 Housing
19 Housing section
20 Housing shell
21 Locking piece
21a Locking groove
21b Groove opening
21c Groove channel
22 Rim
23 Contact surface
24 Flange
25 Locking element
26 Chamber
27 Connecting piece
28 Longitudinal groove
29a Groove opening
29b Groove channel
30 Holding protrusion
30a First link
30b Second link
31 Stop element
32 Groove piece
33 Contact surface
34 Stop surface
35 Lock screw
36 Lock bore
37 Pipe section
38 Pipe section
44 Saddle support
45 Upper frame pipe
46 Saddle support pipe
47 Handle bar pipe
48 Lower frame pipe
49 Bottom bracket receptacle
55 Support point
56 Supporting means
57 Support body
58 Supporting surface
60 Attachment means
61 Fastening point
62 Carrying part
63 Pivoting lever
64 Clamping lever
65 Recess
66 Prong
67 Fastening surface
68 Clamping part
69 Clamping surface 70 Attachment means
75 Electrical connection
76 Connection cable
80 Housing
81 Display
82 Operating element
85 Carrying means
86 Handle grip
A Mounting space
B Width of the mounting space
L Longitudinal direction
Q Crossways direction
R Rounding
S1 First swing axis
S2 Second swing axis
V Connecting plane The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. An energy storage device (10) for attachment to a bicycle frame (11),
    with a housing (18) that as at least one electrical energy storage element (12) disposed therein for providing electrical energy,
    with at least one electrical connection (75) that is preset on the housing (18) and accessible from the outside, and wherein an electrical consumer can be connected thereto, and
    wherein the housing (18) includes two housing sections (19) that are connected to each other by means of a connecting piece (28), and
    wherein a mounting space (A) is provided between the two housing sections (19) that serves for accommodating at least one pipe section (37, 38) of a frame pipe (45, 48) of the bicycle frame (11), and
    wherein the width (B) of the mounting space (30) is at least as large as the width of the pipe section (37, 38) that is to be accommodated therein;
    the width B of the mounting space A corresponds to the distance between the two housing sections measured in a transverse direction Q, wherein the transverse direction Q extends at a right angle through a longitudinal middle plane through the center of the mounting space A;
    the width B of the mounting space A is constant prior to, during and after the attachment of the device to the bicycle frame in the area of the connecting piece 28;
    the connecting piece 28 does not contain energy storage elements 12.

2. The energy storage device (10) according to claim 1, characterized in that the two housing sections (19) have identical shapes and/or sizes.

3. The energy storage device (10) according to claim 1, characterized in that the housing (18) is configured as symmetrical relative to a longitudinal middle plane.

4. The energy storage device (10) according to claim 1, characterized in that a plurality of electrical energy storage elements (12) is disposed inside each housing section (19).

5. The energy storage device (10) according to claim 1, characterized in that the mounting space (A) is designed for accommodating two pipe sections (37, 38) therein that are spaced at a vertical distance in relation to each other.

6. The energy storage device (10) according to claim 1, characterized in that each housing section (19) includes two housing shells (20) that are connected to each other.

7. The energy storage device (10) according to claim 6, characterized in that each housing shell (20) includes an all-around circumferential rim (22) with a contact surface (23), and wherein the two housing shells (20) that constitute a housing section (19) rest against each other at that contact surfaces (23) that face each other.

8. The energy storage device (10) according to claim 7, characterized in that a flange (24) is present along sections on the rim (22) on the side that is opposite in relation to the contact surface (23).

9. The energy storage device (10) according to claim 6, characterized in that the two housing shells (20) are connected to each other by means of a plurality of locking pieces (21).

10. The energy storage device (10) according to claim 9, characterized in that each locking piece (21) includes a locking groove (21a) whose groove opening (21b) is narrower than the groove channel (21c) following thereafter, which is where the two flanges (24) of the two housing shells (20) are disposed after the connection has been established.

11. The energy storage device (10) according to claim 10, characterized in that the connecting piece (28) includes two longitudinal grooves (29) that extend parallel relative to each other in the longitudinal direction (L), each of which has a groove opening (29a) that is narrower than the groove channel (29b) following thereafter.

12. The energy storage device (10) according to claim 11, characterized in that a holding protrusion (30) is provided at least on one locking piece (21) on the side that faces away from the housing section (19) and that, engages with the connecting piece (28) in one of the longitudinal grooves (29), after the connection has been established.

13. The energy storage device (10) according to claim 12, characterized in that the holding protrusion (30) has a first link (30a) that is connected to the locking piece (21) and a second link (30b) that extends away from the first link (30a) only on one side.

14. The energy storage device (10) according to claim 11, characterized in that the connecting piece (28) is connected to the bicycle at two points (55, 61).

15. The energy storage device (10) according to claim 14, characterized in that the connecting piece (28) includes a supporting means (56) by which the connecting piece (28) supports itself on the frame pipe (45) of the bicycle frame (11).

16. The energy storage device (10) according to claim 11, characterized in that the connecting piece (28) includes an attachment means (60) that is designed to mount the connecting piece (28) to a saddle support pipe (46) and/or a saddle support (44) accommodated in the saddle support pipe (46).

17. An energy storage device (10) for attachment to a bicycle frame (11),
    with a housing (18) that has at least one electrical energy storage element (12) disposed therein for providing electrical energy,
    with at least one electrical connection (75) that is present on the housing (18) and accessible from the outside, and wherein an electrical consumer can be connected thereto, and
    wherein the housing (18) includes two housing sections (19) that are connected to each other by means of a connecting piece (28), each housing section 19 includes two housing shells (20) that are connected to each other by means of a plurality of locking pieces (21), each locking piece (21) includes a locking groove (21*a*) whose groove opening (21*b*) is narrower than the groove channel (21*c*) following thereafter, which is where the two flanges (24) of the two housing shells (20) are disposed after the connection has been established;

wherein a mounting space (A) is provided between the two housing sections (19) that serves for accommodating at least one pipe section (37, 38) of a frame pipe (45, 48) of the bicycle frame (11), and wherein the width (B) of the mounting space (30) is at least as large as the width of the pipe section (37, 38) that is to be accommodated therein.

18. The energy storage device (10) according to claim 17, characterized in that a holding protrusion (30) is provided at least on one locking piece (21) on the side that faces away from the housing section (19) and that engages with the connecting piece (28) in one of the longitudinal grooves (29), after the connection has been established.

19. The energy storage device (10) according to claim 18, characterized in that the holding protrusion (30) has a first link (30*a*) that is connected to the locking piece (21) and a second link (30*b*) that extends away from the first link (30*a*) only on one side.

20. The energy storage device (10) according to claim 17, characterized in that the connecting piece (28) is connected to the bicycle at two points (55, 61).

21. The energy storage device (10) according to claim 20, characterized in that the connecting piece (28) includes a supporting means (56) by which the connecting piece (28) supports itself or frame pipe (45) of the bicycle frame (11).

22. The energy storage device (10)according to claim 17, characterized in that the connecting piece (28) includes an attachment means (60) that is designed to mount the connecting piece (28) to a saddle support pipe (46) and/or a saddle support (44) accommodated in the saddle support pipe (46).

\* \* \* \* \*